United States Patent
Ho et al.

(10) Patent No.: US 12,465,912 B2
(45) Date of Patent: Nov. 11, 2025

(54) SYSTEMS AND METHODS FOR CONTROLLED MEMBRANE DISRUPTION

(71) Applicant: The Chinese University of Hong Kong, Shatin (CN)

(72) Inventors: Yi-Ping Ho, Ma On Shan (CN); Michael Kenneth Chan, Kowloon Tong (CN); Ming Ming Marianne Lee, Kowloon (CN); Chung Hong Nathaniel Wong, Quarry Bay (CN); MD Habibur Rahman, Hung Hom (CN)

(73) Assignee: The Chinese University of Hong Kong, Shatin (CN)

( * ) Notice: Subject to any disclaimer, the term of this patent is extended or adjusted under 35 U.S.C. 154(b) by 988 days.

(21) Appl. No.: 17/602,728

(22) PCT Filed: Apr. 10, 2020

(86) PCT No.: PCT/CN2020/084117
§ 371 (c)(1),
(2) Date: Oct. 8, 2021

(87) PCT Pub. No.: WO2020/207456
PCT Pub. Date: Oct. 15, 2020

(65) Prior Publication Data
US 2022/0168739 A1    Jun. 2, 2022

Related U.S. Application Data

(60) Provisional application No. 62/832,638, filed on Apr. 11, 2019.

(51) Int. Cl.
*B01L 3/00*    (2006.01)

(52) U.S. Cl.
CPC ..... *B01L 3/502746* (2013.01); *B01L 3/50273* (2013.01); *B01L 2200/12* (2013.01);
(Continued)

(58) Field of Classification Search
CPC ...... C12M 35/00; C12M 23/16; C12M 35/04; B01L 3/502746; B01L 3/50273;
(Continued)

(56) References Cited

U.S. PATENT DOCUMENTS 10,688,493 B2 *    6/2020    Kim ................ B01L 3/502738
2003/0044323 A1 *    3/2003    Diamond ............... G01N 35/10
211/74

(Continued)

FOREIGN PATENT DOCUMENTS

CN    103987836 A    8/2014
CN    105848793 A    8/2016
(Continued)

OTHER PUBLICATIONS

International Search Report and Written Opinion for PCT Patent Application No. PCT/CN2020/084117, mailed Jul. 1, 2020, 11 pages.

*Primary Examiner* — Shogo Sasaki
(74) *Attorney, Agent, or Firm* — Kilpatrick Townsend & Stockton LLP

(57) ABSTRACT

A module of microfluidic device used for applying shear stress to cells (501) in order to deliver payloads (502) to the cells (501). The module includes cross junction modules (105), serpentine modules and squeezing-relaxing modules (1101). The devices and related methods result in increased payload (502) delivery and reduced loss in cell (501) viability.

22 Claims, 16 Drawing Sheets

(52) U.S. Cl.
CPC ... *B01L 2200/16* (2013.01); *B01L 2300/0663* (2013.01); *B01L 2300/0867* (2013.01); *B01L 2300/0883* (2013.01); *B01L 2400/0478* (2013.01)

(58) Field of Classification Search
CPC ......... B01L 2300/0663; B01L 2200/12; B01L 2400/0478; B01L 2300/0883; B01L 2200/16; B01L 2300/0867
See application file for complete search history.

(56) References Cited

U.S. PATENT DOCUMENTS

| | | | |
|---|---|---|---|
| 2008/0190735 A1* | 8/2008 | Luoma | G01N 35/0095 422/65 |
| 2018/0201889 A1 | 7/2018 | Sharei et al. | |
| 2018/0314046 A1* | 11/2018 | Sakurai | G02B 21/365 |
| 2021/0138462 A1* | 5/2021 | Klein | G01N 33/84 |
| 2023/0102733 A1* | 3/2023 | Klein | G01N 33/54306 324/204 |

FOREIGN PATENT DOCUMENTS

| | | |
|---|---|---|
| CN | 107002089 A | 8/2017 |
| CN | 107109362 A | 8/2017 |
| CN | 107250373 A | 10/2017 |
| CN | 107771102 A | 3/2018 |
| WO | 2015/102726 A2 | 7/2015 |

* cited by examiner

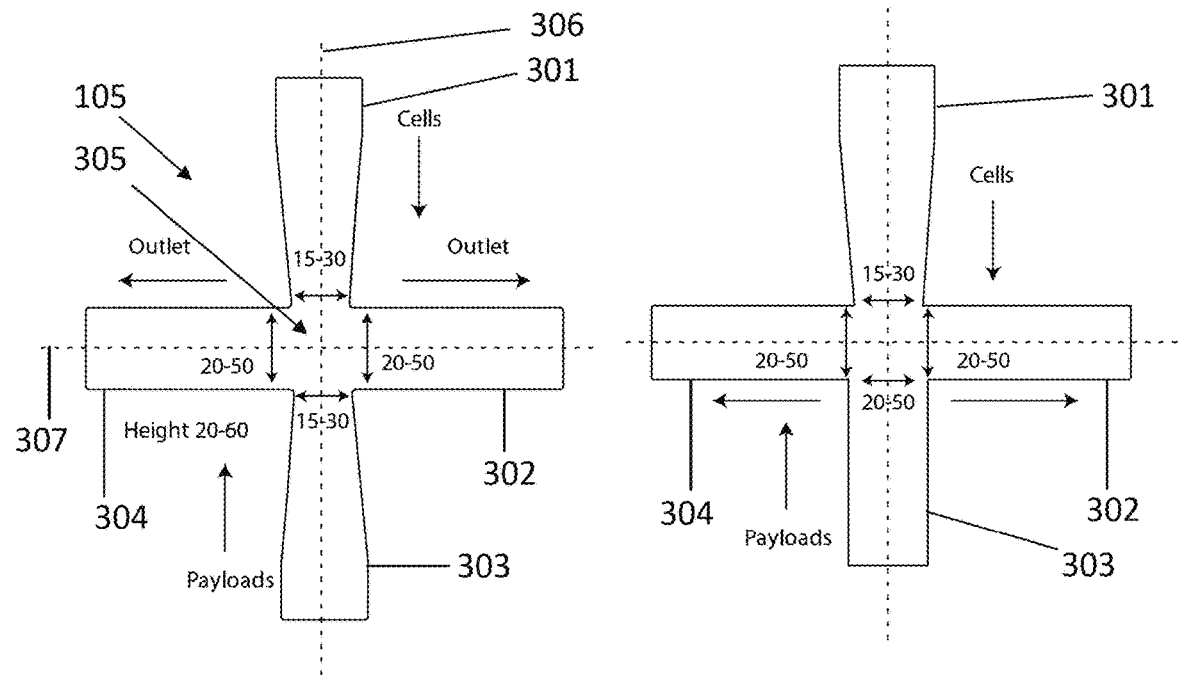
Fig. 3A
Fig. 3B
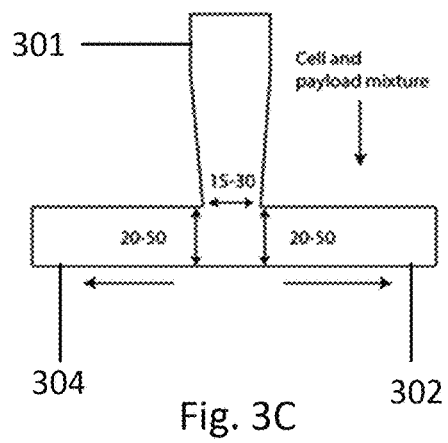
Fig. 3C
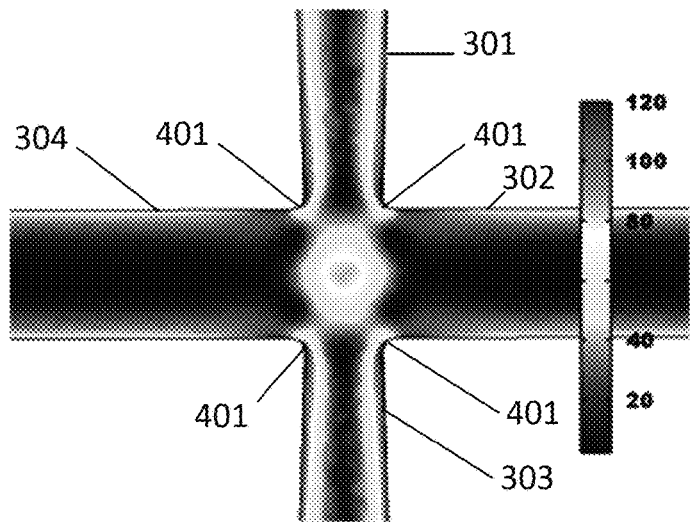
Fig. 4

| Flow rate (μl/min) | Linear velocity (mm/s) | Mean shear stress (Pa) |
|---|---|---|
| 20 | 138 | 5.4 |
| 40 | 277 | 10.9 |
| 60 | 416 | 16.4 |
| 80 | 555 | 21.9 |

| Flow rate (μl/min) | Average velocity (mm/s) | Mean shear stress (Pa) |
|---|---|---|
| 50 | 1.0 | 46.35 |
| 60 | 1.25 | 55.63 |
| 70 | 1.46 | 64.90 |
| 80 | 1.67 | 74.17 |
| 90 | 1.88 | 83.44 |

| Geometry (μm), height 60 μm | | Shear duration (@ 50ul/min flow rate) | Mean shear stress (Pa) |
|---|---|---|---|
| W = 15 | L = 300 | 0.8 ms | ~ 30 |
| | L = 600 | 1.6 ms | |
| | L = 1200 | 3.2 ms | |

Fig. 8A

| Geometry (μm), height 40 μm | | Shear duration (@ 70μl/min flow rate) in ms | Mean shear stress (Pa) |
|---|---|---|---|
| W = 20 | L = 300 | 0.2 | 64.9 |
| | L = 600 | 0.41 | |
| | L = 900 | 0.61 | |
| | L = 1200 | 0.82 | |
| | L = 1500 | 1.03 | |
| | L = 1800 | 1.23 | |
| | L = 2100 | 1.44 | |

Fig. 8B

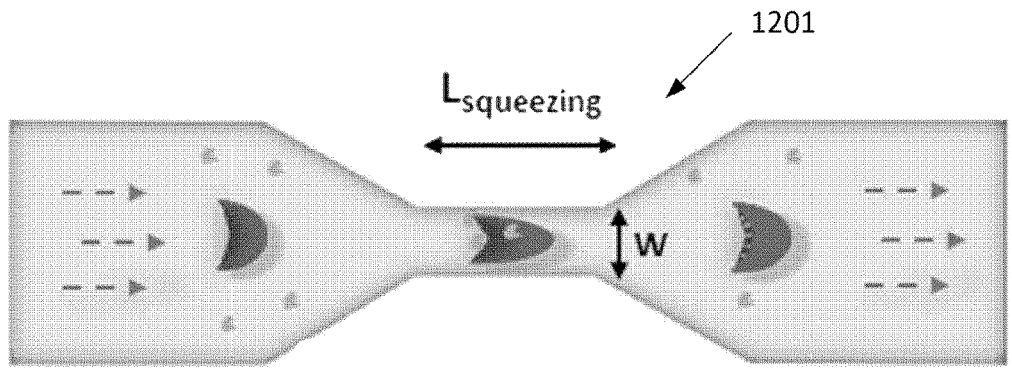
Fig. 12A
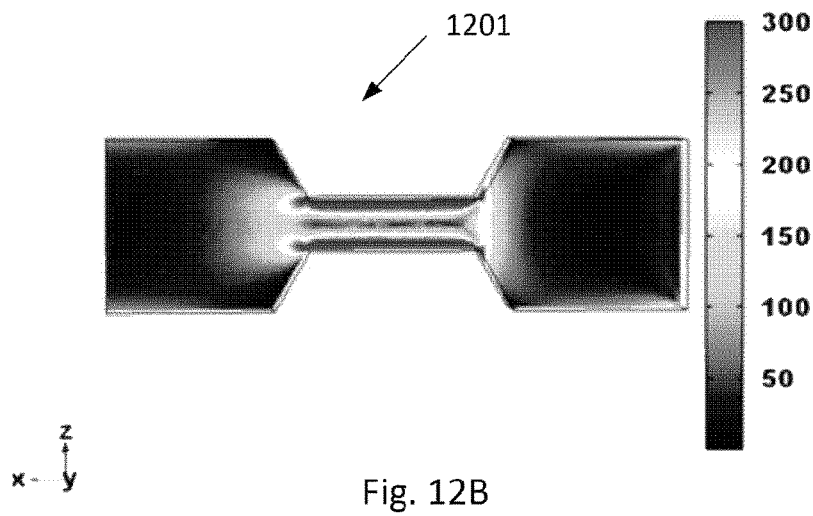
Fig. 12B
Table R1: Envisioned constricted width of the squeezing channel based on cells Young's modulus.
| Cell Young's modulus (stiffness) | Squeezing width (w), μm | Squeezing length, ($L_{squeezing}$) μm | Relaxing length, ($L_{relaxing}$) μm | Height, μm |
|---|---|---|---|---|
| (~1 KPa), HEK293, C2C12 | 10-15 | 30-100 | 100-300 | 20-60 |
| (>5KPa), SH-SH-SY5Y, RBCS | 5-10 | 30-100 | 100-300 | 20-60 |
Fig. 13

SYSTEMS AND METHODS FOR CONTROLLED MEMBRANE DISRUPTION

FIELD

The present technology relates to microfluidic devices used for delivering a broad range of payload material to a variety of cell types.

BACKGROUND

Delivering exogenous compounds into the intracellular space of a cell is used for various therapeutic and biological research applications. Challenges associated with existing payload delivery include low payload loading efficiency and viability of resulting cells Accordingly, there exists a need for a payload delivery system with high loading efficiency and high viability of resulting cells.

SUMMARY

The present technology includes modules of microfluidic devices used for applying shear stress to cells in order to deliver payloads to the cells. The module includes cross-junctions, serpentine modules and squeezing-relaxing modules. The devices and related methods result in increased payload delivery and reduced loss in cell viability compared to previous payload delivery technology.

BRIEF DESCRIPTION OF THE DRAWINGS

The disclosure will be readily understood by the following detailed description in conjunction with the accompanying drawings, wherein like reference numerals designate like structural elements, and in which:

FIGS. 3A-3C show embodiments of cross-junction modules.

FIG. 4 shows a stress distribution in cross junction module.

FIG. 8A-8B show tables of examples of dimensions of the constricted serpentine channel and the shear duration at a constant shear stress

FIGS. 12A and 12B show an embodiment of a squeezing-relaxing module.

FIG. 13 shows a table of dimensions of squeezing-relaxing modules.

DETAILED DESCRIPTION

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

In embodiments microfluidic modules are used to apply stresses on a cell in order to deform the cell, associate payloads with the cell membrane, and encapsulate payloads within the cell. Controllably deforming the cells is used to controllably form pores in the cell membrane and/or controllably internalize payloads associated on the cell membrane. The technology may be used on both nucleated and enucleated cells. The geometries of the microfluidic modules, the flow rates and velocities of fluids, and/or the viscosity of fluid may be selected to achieve a desired shear stress magnitude and duration of deformation. These properties may be selected based on properties specific to the type of cell being used (e.g. mass, volume, membrane stiffness) and/or properties of the payload being delivered (e.g. mass, volume).

Figure 1:
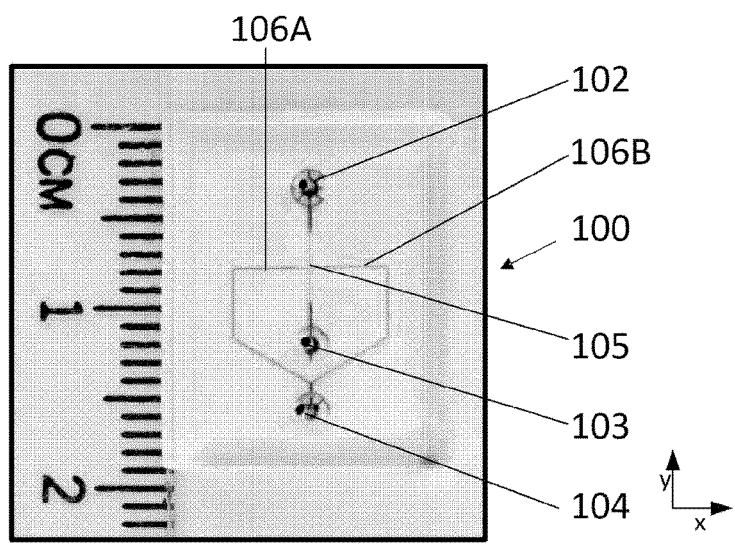
FIG. 1 shows an embodiment of a microfluidic chip according to the present technology.

FIG. 1 shows a microfluidic chip 100. Microfluidic chip 100 is generally planar in shape with a small thickness, in the z-direction perpendicular to the page, relative to the area, in the x and y direction parallel to the page. Microfluidic chip 100 includes a plurality of channels within the microfluidic chip 100 extending through the thickness the xy plane. As shown, microfluidic chip 100 includes a first input port 102 and a second input port 103. First and second input ports are used to introduce fluids into the channels of the microfluidic chip 100. For example, first input port may be used to introduce cells into the channels of the microfluidic chip 100 and second input port may be used to introduce a payload into the channels of the microfluidic chip 100. In embodiments, the use of the input ports and/or the orientation may be changed without departing from the scope of the technology.

Microfluidic chip 100 further includes an output port 104. Output port is used to collect fluids, and particularly cells in the fluid, that flowed through the channels from the input ports. In embodiments, microfluidic chip 100 may include any number of one or more input ports and any number of one or more output ports.

Figures 2A, 2B:
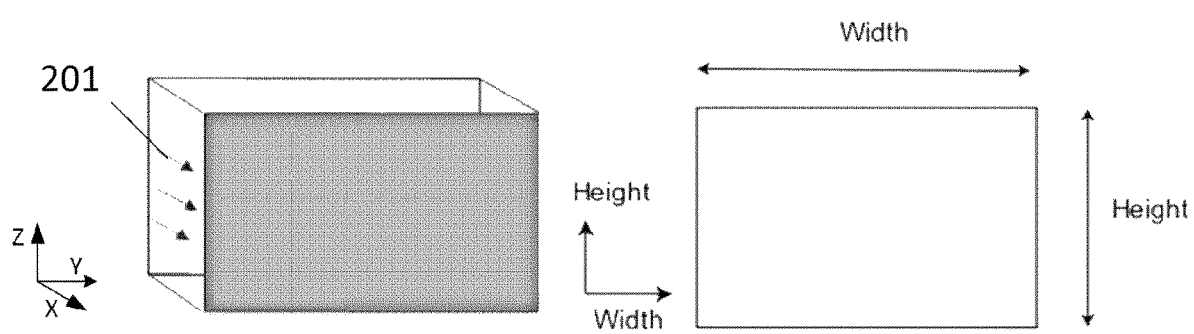
FIGS. 2A and 2B show cross-sections of a channel of a microfluidic chip.
Figures 6A, 6B, 6C:
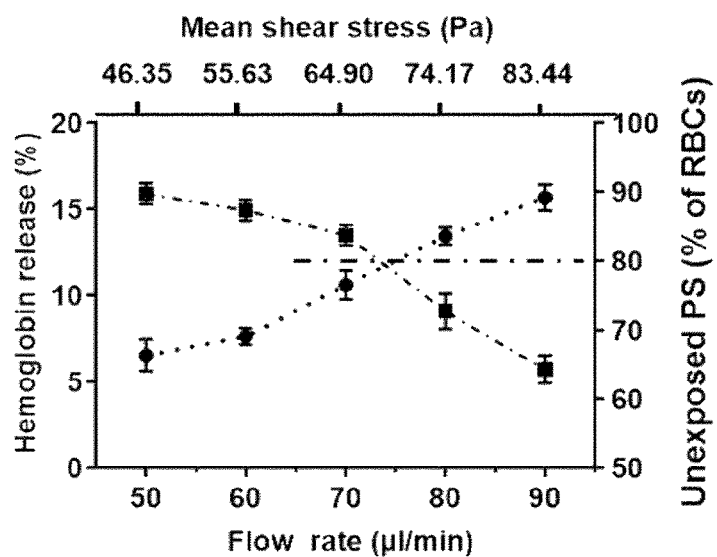
FIGS. 6A-6B show tables of examples of different flow rates and employed mean shear stress into an input channel of a cross junction module.
FIG. 6C shows a graphing showing the effect of shear stress to the hemoglobin release and percentage of RBCs with unexposed PS.

FIGS. 2A and 2B show example cross-sections of a channel of a microfluidic chip, for example microfluidic chip 100. As shown the cross-section may be rectangular with a height in the Z-direction, also referred to as depth of thickness, and a width in the X-direction or Y-direction. In embodiments, the cross-sectional shape of the channels may be shapes other than rectangular, for example tapered or semicircular. As shown in FIG. 2A, fluid flows 201 through the cross-section generally in the X-direction and/or Y-direction. In embodiments, the channels have a height/depth in the range between 20-60 μm and may be formed for example by a soft lithography process. The depth/height of the channels, and particularly in difference modules of the microfluidic chip have a significant effect on the shear stress exerted on cell membrane by a particular module, and the depth/height of the channels for each module is selected based on the shear required to deform the cells based on the mechanical properties of the cells. For example, for red blood cells (RBC) a channel height may be 40 μm, which keeps the shear stress lower than 20 Pa, which is the pressure at which may rupture the RBC) under the operational flow rates. In embodiments, the channel height is constant for a channels on the microfluidic chip. In embodiments, for example when using RBC the operational flow rate is optimized at 50 μL/min. The relationship of flow rate and mean shear stress, for example as shown in FIGS. 6A and 6B, was calculated based a channel height of 40 μm.

As shown in FIG. 1, the first input port 102 and the second input port 103 are each fluidly coupled to a cross junction module 105. Post-mix channels are also fluidly coupled to the cross-junction modules. For example, as shown first post-mix channel 106A and second post-mix channel 106B extend in opposite directions from the cross junction module and connect downstream of the cross junction 105 to fluidly couple to the output port 104. The general flow path of fluids through the microfluidic chip 100 is from one or both of the input ports, through the cross-junction, into the post-mix channels and out of the output port. As shown, the post-mix channels may include multiple bends and straight sections so that they merge together at the output port. As shown, the second input port 103 is bounded by an area defined by the cross-junction, post-mix channels, and output port. As will be discussed in more detail below, one or more of the post-mix channels may include one or more microfluidic modules for relaxing and/or restricting the flow of the cells in order to control deformation of the cells and causes payloads associated with the cell membrane to be encapsulated within the cell.

Cross-Junction

FIG. 3A shows an embodiment of cross junction module 105. Clockwise from the top, the cross-junction comprises a first channel 301, a second channel 302, a third channel 303, and a fourth channel 304. The first, second, third, and fourth channels intersect at a central intersection 305. As shown, the first channel 301 and third channel 303 oppose each other along a first axis 306. First and third channels may be referred to as input channels because they are used to introduce fluid into the central intersection. Further, the second channel 302 and fourth channel 304 oppose each other along a second axis 307. Second and fourth channels may be referred to as output channels because they are used to output fluid out of the central intersection toward the output port. The first axis 306 and second axis 307 may be perpendicular so that the four channels are equally spaced radially.

The first channel 301 is fluidly coupled to the first input port 102. The third channel 303 is fluidly coupled to the second input port 103, and the second and fourth channels 302 and 304 are fluidly coupled to the first and second post mix channels 106A and 106B, respectively. With this configuration of fluid couplings the cross-junction forms a stagnation point at the center of the central intersection caused by the in-flow from the opposing first and third channels and the outflow from the opposing second and fourth channels. This cross junction geometry is used to create the stagnation point at the center of central intersection and along the Z-direction in order to allow for precise control of cell membrane deformation of a cell introduced with a flow velocity through one of the input channels.

FIG. 3A further shows dimensions of the embodiment of the cross junction 105. As shown the first channel 301 may have an opening width into the central intersection 305 between 15 micrometers and 30 micrometers. As shown the third channel 303 may also have an opening width into the central intersection 305 between 15 micrometers and 30 micrometers. In embodiments, the first and third channels have the same width openings into the central intersection in order to maintain identical fluid velocity in order to control a stagnation point formed in the central intersection 305.

Further, as shown the first channel may have a tapering toward the opening into the central intersection. The tapering geometry of the first channel induces a hydrodynamic focusing of cells introduced through the first input port 102, allowing an alignment of cells across the width of the first channel in order to allow for a symmetrical stretching or deformation of cell membranes, and to control the flow velocity and/or the stress provided on the cell membranes, as will be discussed in greater detail below. In embodiments, the third channel may have an identical taper into the central intersection in order more easily control identical flow into the central intersection.

In embodiments, for example as shown in FIG. 3A, the second and fourth channels have parallel sidewalls and have openings from the central intersection between 20 micrometers and 50 micrometers. In embodiments, the second and fourth channels have the same width openings into the central intersection. As will be discussed in greater detail below, the second and fourth channels are identical in size in order for the stagnation point to be centrally positioned in the central intersection.

FIG. 3B shows an embodiment of a cross-section wherein one of the input channels is tapered and the other is straight. Specifically as shown, the first channel 301 may be tapered with a narrower opening into the central intersection than the opening of the third channel 303, which does not have tapered side walls. Having non-identical input channels allows for example for the payload inlet to be wider than the cell inlet in order for a higher concentrations of payloads to interact with the cells.

FIG. 3C shows an embodiment of a cross junction including only three channels, one input channel and two output channels. Flow in through the first channel 301 and out through the opposing second and fourth channels 302 and 304 causes a stagnation point similarly as the flow of the cross junction of FIG. 3A. The flow into the first channel may be pre-mixed with cells and payloads.

FIG. 4 shows stress distributions in the cross junction module caused by flow into the first and third channels toward the central intersection. As shown the corners 401 between adjacent channels may be rounded in order to prevent vortexes in the central intersection and promote a lamination flow from the input channels into the output channels. Defining a radius of the corners may be accomplished using a high resolution metallic mask during the fabrication process of the microfluidic chip.

Figure 17:
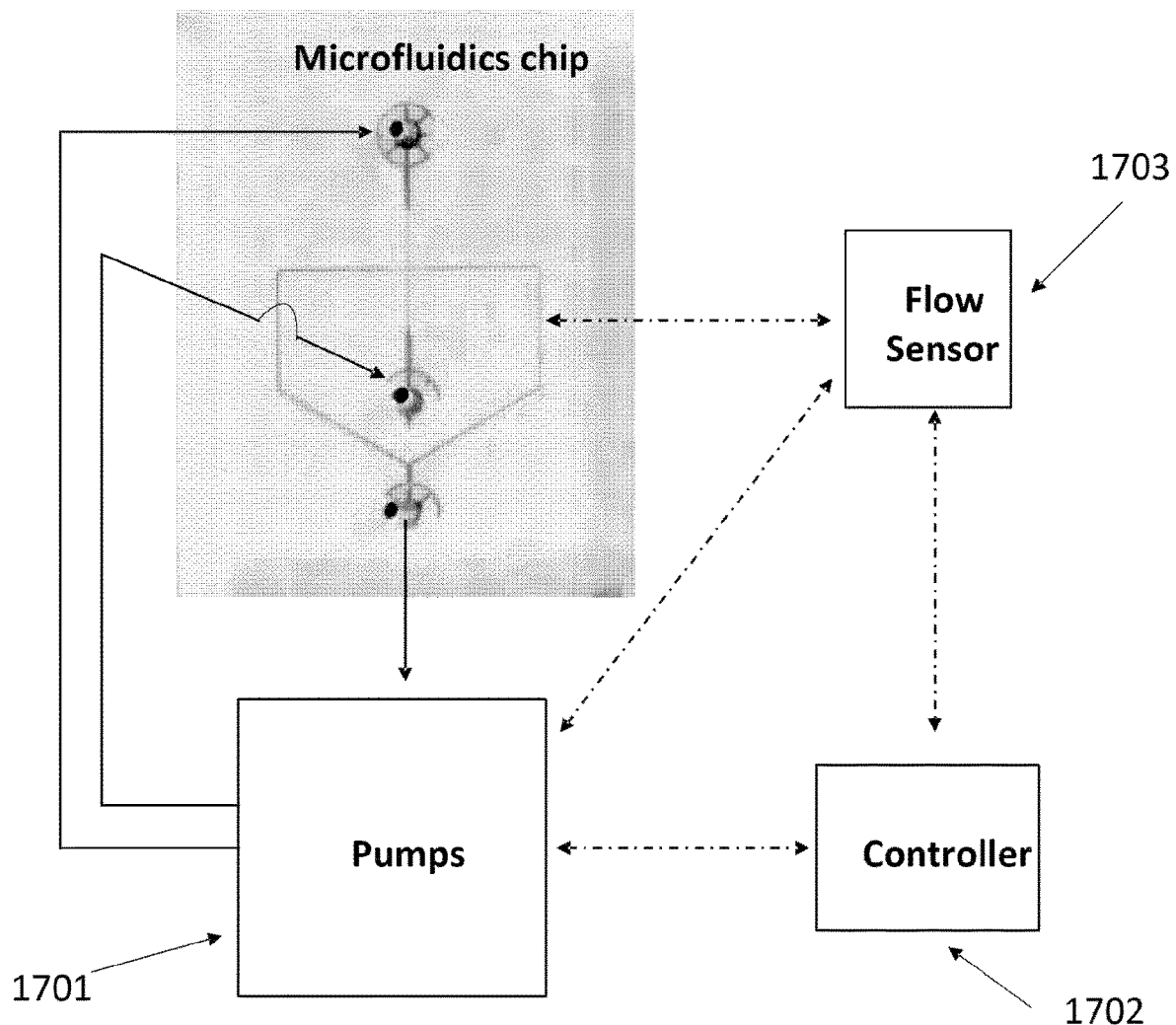
FIG. 17 shows an embodiment including a microfluidic chip, pumps, controller and sensors.

As shown in FIG. 1, the first channel may be an input for cells, for example red blood cells, and the third channel may be any input for payloads, however in embodiments these input to each channel may be reversed. In embodiments, the flow of fluids into the input ports, and therefore throughout the system of channels of the microfluidic chip may be controlled by various pump apparatuses such as pressure pumps, gas pumps, peristaltic pumps, and/or syringe pumps. In embodiments, the pump apparatuses 1701 may be connected to a controller 1702 used to control the flow from each pump apparatus, for example as shown in FIG. 17. The controller may receive feedback from sensors 1703 connected directly to the pump apparatus 1701 and/or monitored fluid flow with flow sensors at one or more points along the channels of the microfluidic chip, for example as shown in FIG. 17. Examples of flow sensors include Coriliolis flow sensors, thermal flow sensors, and Doppler flow sensors In embodiments with a pressure-based fluid control system flow sensors may be used to convert applied pressure to a flow velocity, whereas in embodiments with a syringe pump a flow rate may be directly set based the displacement of the plunger over time.

Precise control of flow velocity is important in obtaining a balance between over stretching or sheer the cells and damaging the cells, and under stretching or shearing the cells leading to low yield of encapsulated payloads. In embodiments, a high precision syringe pump, such as the PHD 2000 Harvard Apparatus, or similar devices may be used to input the cells and/or payload.

The cells and payload may be introduced into the channels of the microfluidic chip in buffer solutions. For example, the cells may be suspended in phosphate buffer saline (PBS, an isotonic buffer). The concentration of the cells and payloads with the buffer solutions may be set based on the cell properties, the payload properties, and the desired amount of payload delivered to the cells. For example, for red blood cells a concentration may ranges between 2-5 million/ml and the payloads (enzyme) concentrations in the ranges of 100 nM to 1 uM.

Figure 5A:
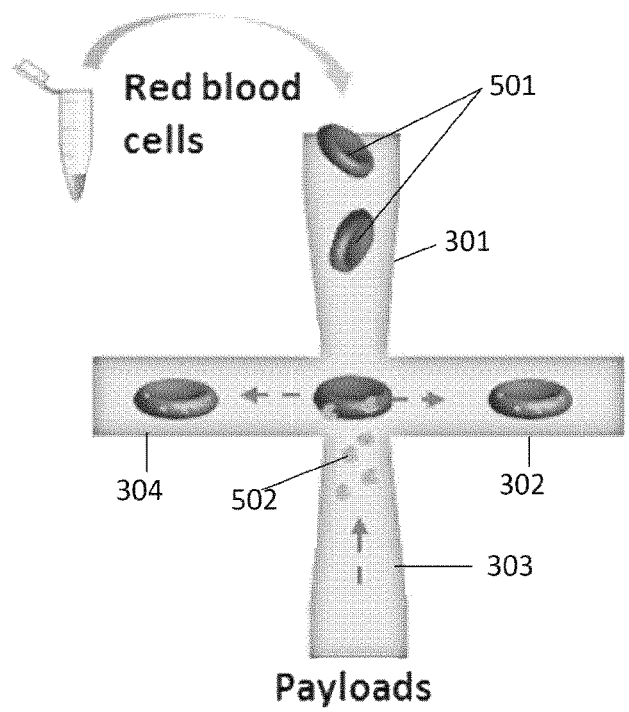
FIGS. 5A-5C show a representation of a cell, and a cell membrane being stretched in a cross-junction module.
Figure 5B:
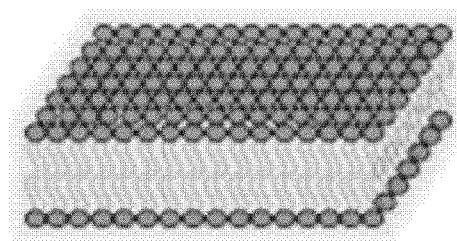
Figure 5C:
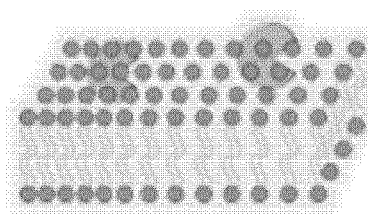

FIGS. 5A-5C show a representation of a cell, and the cell membrane being stretched in a cross-junction. FIG. 5A shows cells 501 being introduced into the first channel, and a payload 502 being introduced into the third channel. The flows into the first and third channels causes the stagnation point to form in the central intersection which causes the cells present in the central intersection to be stretched and then flow out through either the second or through channel. FIG. 5B shows an intact membrane of a cell prior to introduction into the cross-junction, and FIG. 5C shows the membrane of the cell stretched while exposed to shear while in the cross-junction. When in the stretched state, the payload, for example an enzyme, is more easily able to associate with the cell membrane, compared to the un-stretched state. The flow rates into the first and third channels may be controlled based on cell properties and a desired amount of cell deformation. For example, lysis of Red Blood Cells (RBC) and Human Embryonic Kidney cells (HEK293) occurs at mean shear stress around 150 Pa and 16.4 Pa, respectively, and the stress applied in the microfluidic modules is selected to prevent rupture of the cell membranes. For example, the device may deform a RBC with a shear stress in the range of 15-120 Pa to achieved different amounts of cell deformation without rupturing the cell.

FIG. 6A shows first examples of different flow rates into the third channel and the associated linear velocity through the opening of the third channel into the central intersection, and the mean shear stress in the central intersection. As shown, the shear stress is approximately linearly related to the flow rate.

In embodiments, the flow rates, and geometries of the cross junction are selected based on the type of cell. For example, different cells have different membrane stiffness. In embodiments, the cell deformation occurs between 0.8-3.2 milliseconds. The ranges of shear exposure duration may be optimized based on the cell stiffness. The degree of cell deformation, which is a combined effect of magnitude and duration of shear stress exposure, is a balance between the integrity of treated cells and payload loading efficiency.

FIG. 6B shows second examples of different flow rates into the third channel and the associated average velocity through the opening of the third channel into the central intersection, and the mean shear stress in the central intersection. As shown in FIG. 6B, the shear stress resulting from the flow rates between 50 μL/min and 90 μL/min are between 46.35 Pa and 83.44 Pa. The flow rates and associated shear stresses shown in FIG. 6B were applied to mice RBCs to validate membrane pore formation, the results of which are shown in FIG. 6C.

Specifically, FIG. 6C shows a relation among the mean shear stress, hemoglobin (Hb) release, and PS unexposed percentage of red blood cells (RBCs) as a model. The amount of Hb released is used as an indicator for membrane poration, and the preserved membrane integrity is identified by comparing the phosphatidylserine (PS) exposure of untreated and treated RBCs.

In some cases, membrane pore formation may hamper the integrity of RBC membrane. Therefore, phosphatidylserine (PS) externalization from inner leaflet to the outer leaflet may be subsequently quantified to evaluate the degree preserved membrane integrity. As PS externalization is correlated with the clearance of RBCs in the circulation, minimal PS exposure i.e. higher preserved membrane is preferable. Typical threshold preserved membrane integrity has been considered as 80% or above, however any percentage of preserved membrane integrity may be selected and may be based on cell types and cell membrane recovery mechanism. Accordingly, in the example of FIGS. 6B and 6C a mean shear stress of 64.9 Pa, corresponding to 70 μl/min is selected as the optimum condition. In embodiments, samples of a cell line may be subjected to different shear stresses, with different flow rates, and the corresponding hemoglobin (Hb) release and phosphatidylserine (PS) externalization may be tested in order to determine an optimum shear stress to achieve a desired preserved membrane integrity specific to the membrane stiffness of the cell line.

Constriction and Relaxation Modules

In embodiments the microfluidic chip 100 may include additional modules downstream of the cross-junction. The additional modules may be used to continuously stretch the cells in a constricted zone in order for payloads associated with the cell membranes in the cross junction to be encapsulated within the cell. Further, the additional modules may be used to relax the cells after exiting the cross junction module in order to prevent over-stressing of the cell membranes. The additional modules may be place along the post-mix channels extending between the output channels of the cross junction module and the output port.

Serpentine Channel Module

Figure 7A:
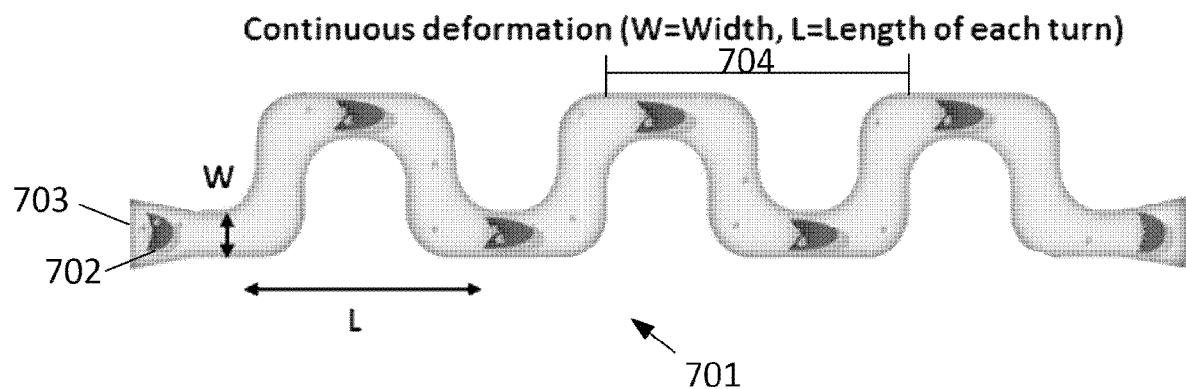
FIGS. 7A-7D show embodiments of a constricted serpentine channel module.

In embodiments, the microfluidic chip 100 includes one or more serpentine channels between the output channels of the cross-junction 105 and the output port 104 along the post-mix channels 106A and 106B. FIG. 7A shows an embodiment of a microfluidic serpentine channel 701. As shown a cell 702 enters a first side 703 of the channel and flows through a series of S-shaped curves 704. As shown in FIG. 7A a constricted serpentine channel 701 may include three full S-shaped curves 704, however more or less curves may be present.

Constricted serpentine channels induce rotation of cells from the cross junction with payloads associated with the cell membranes. The rotation increases the interaction between the cells and the payloads during the extended stretching Further, the cell membranes of the cells flowing through the constricted serpentine channel experiences a normal force from the side wall, which enables active pushing of the membrane associated payloads into the cytosolic region of the cell.

Figure 7B:
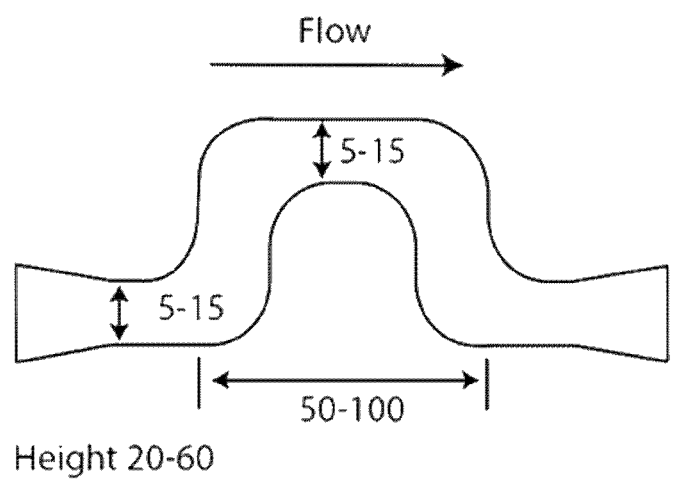
Figure 7C:
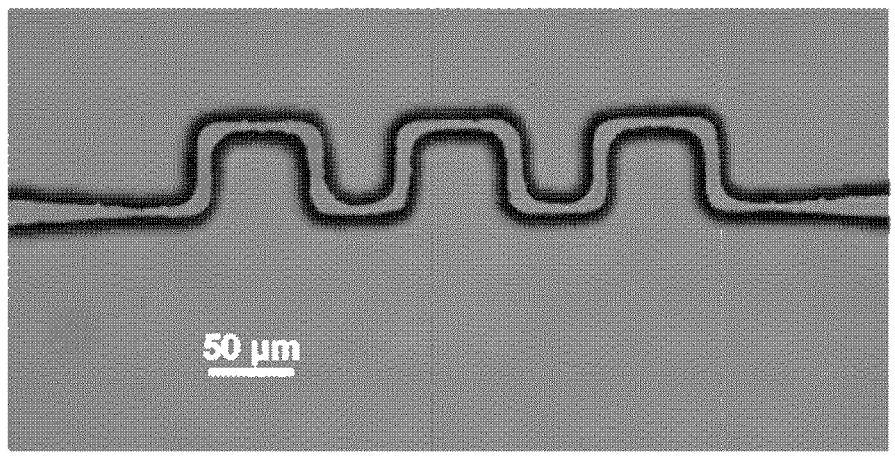

FIG. 7B shows dimensions of a portion of the S-shared curves of a constricted serpentine channel. The constricted serpentine channel may be between 15-30 micrometers wide and have a constant width through the flow path through the S-shaped curves. The width of the serpentine channel is selected based on the cell size and the cell stiffness. In embodiments the portions of the post-mix channels between the cross junction and the serpentine channel may be wider than the width of the constricted serpentine channel, for example 50 μm wide as shown in the microscopic view of a constricted serpentine channel in FIG. 7C.

Figure 7D:
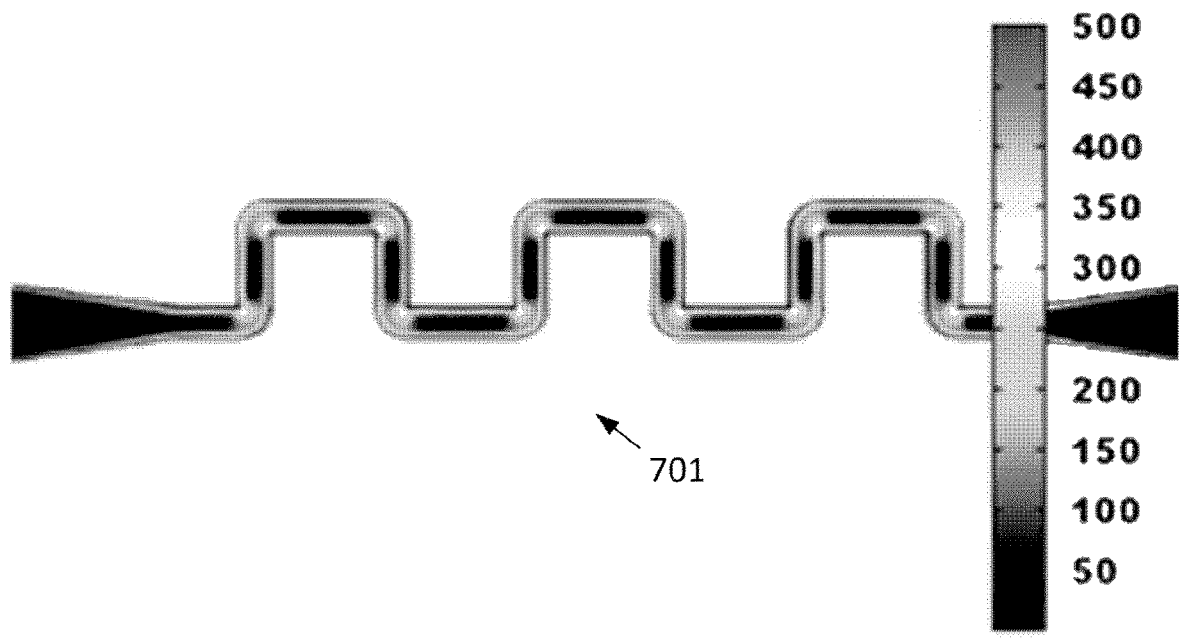

FIG. 7D shows stress distributions in the serpentine channel 701 caused by flow into the opening. When a cell with a payload associated with the cell membrane enters the constricted serpentine channel the stresses applied at multiple portions along the flow path modulates the cells deformation in order to internalize the associated payloads.

Figure 9A:
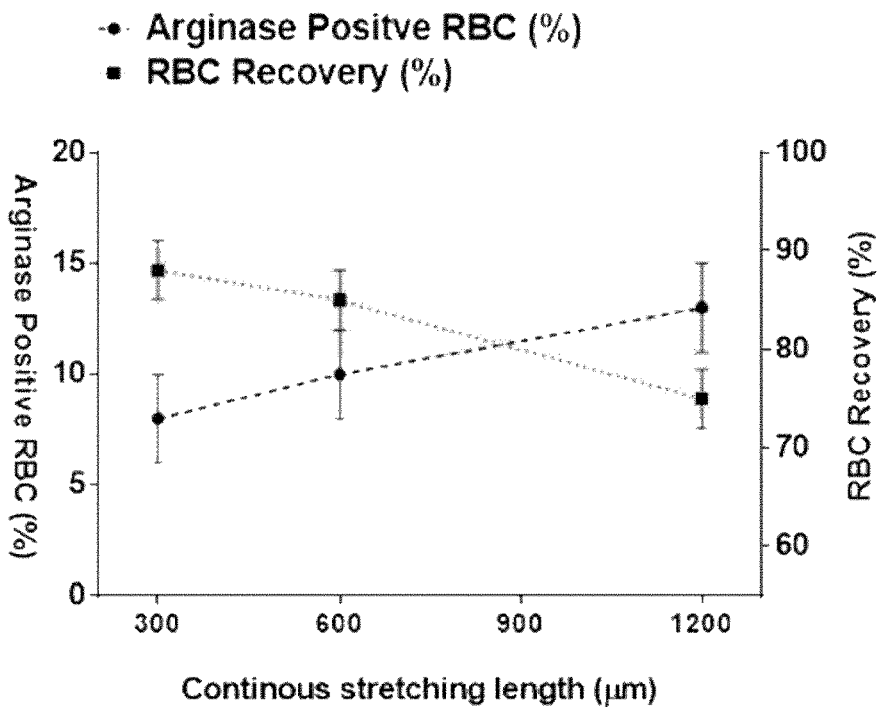
FIG. 9A shows a graph of the effect of shear exposure duration to the payload loading efficiency and cells recovery after treatment.

FIG. 8A shows first examples of different length dimensions, each with the same height and the same width, of a constricted serpentine channel and the corresponding shear duration for a flow rate of 50 μL/min. Other factors which may be selected to achieve a desired duration include the flow rate, the volume and mass of the cell relative to the cross-sectional area of the serpentine channel, the number of S-curves/waves, and the total length of the serpentine channel. Further the width and depth may be selected based on a desired magnitude of the shear stress corresponding to the mechanical properties of the cell. FIG. 9A shows a graph of the effect of shear exposure duration to the payload loading efficiency and cells recovery after treatment. As shown, by increasing the shear duration (length of the stretching zone by serpentine channel), the loading efficiency may boost up, however, at the same time the recovery percentage of treated RBCs may also reduce. For the demonstration with RBC, the shear stress duration at around 30 Pa was optimized between 0.8-3.2 ms.

Figure 9B:
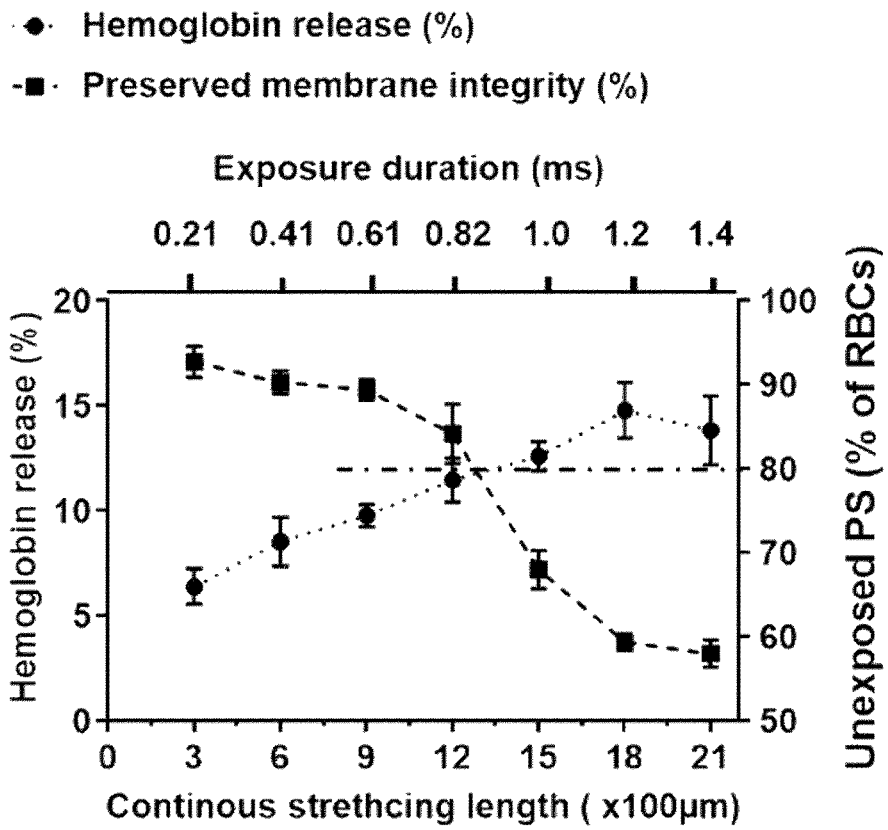
FIG. 9B shows a graph of hemoglobin release and unexposed (PS) percentage of RBC.

FIG. 8B shows second examples of different length dimensions, each with the same height and the same width, of a constricted serpentine channel and the corresponding shear duration for a flow rate of 70 μL/min. The extended shear in the serpentine channel furthers pore formation. However, extending durations and/or magnitudes of extended shear may damage the cellular membrane. Accordingly, the duration of shear exposure in a serpentine channel may be selected to achieve a predetermined percentage of cells have a preserved membrane integrity. In embodiments, the duration of shear exposure may be based on the selected percentage of preserved membrane integrity. For example, with a 80% percentage of preserved membrane integrity the duration of shear exposure may be optimized at a constant shear stress (64.9 Pa), for example as shown in FIG. 8B. FIG. 9B shows the results of experimentation illustrating the relationship of shear exposure duration against the percentage of hemoglobin release and preserved membrane integrity.

As shown in FIG. 9B, by increasing the shear duration (length of the stretching zone), Hb release through the membrane pores increases, however, the degree of cell damage also increases leading to reduced membrane integrity. By the same rationale of keeping >80% membrane integrity, the shear stress duration may selected to be 0.61-1.03 ms given the mean shear stress of 64.9 Pa., the ranges may be optimized based on the cell stiffness.

Figure 10A:
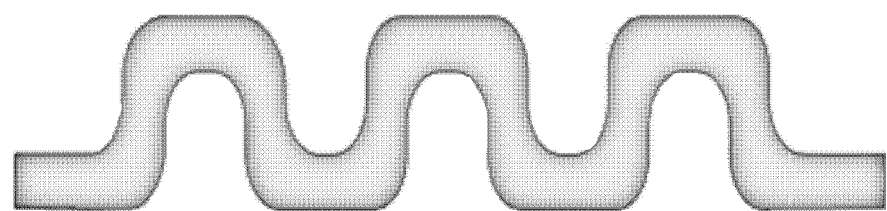
FIGS. 10A and 10B show embodiments of a relaxed serpentine channel module.
Figure 10B:
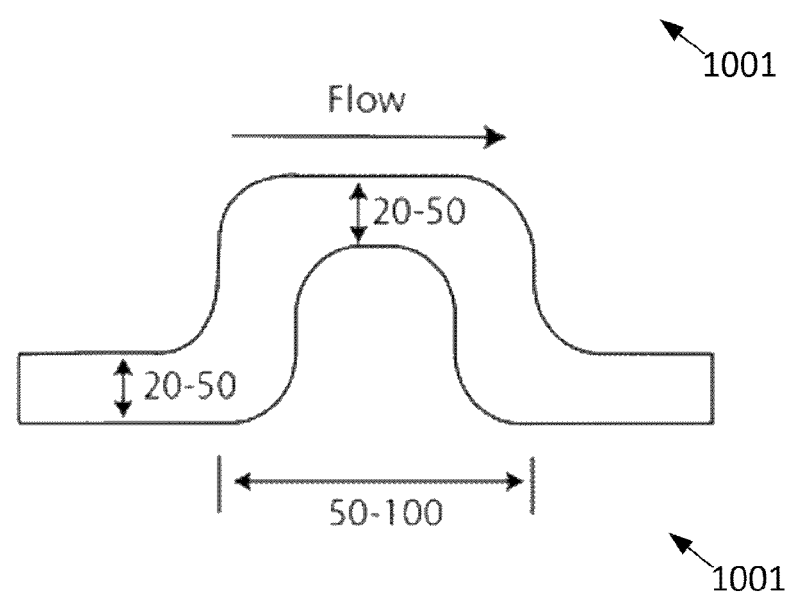

In embodiments, the microfluidic chip may include one or more relaxing serpentine modules 1001 along the post-mix channels 106A and 106B upstream and/or downstream of a constricting module, for example a serpentine constricting module. Relaxing modules prevent cells from becoming over-stressed after passing through a cross junction module and/or a constricting module. FIGS. 10A and 10B show a serpentine relaxing module 1001, with similar shape to serpentine channel 701. In embodiments, the serpentine relaxing module 1001 is wider than the serpentine constricting module 701 that is used for stretching cells.

Squeezing-Relaxing Module

Figure 11A:
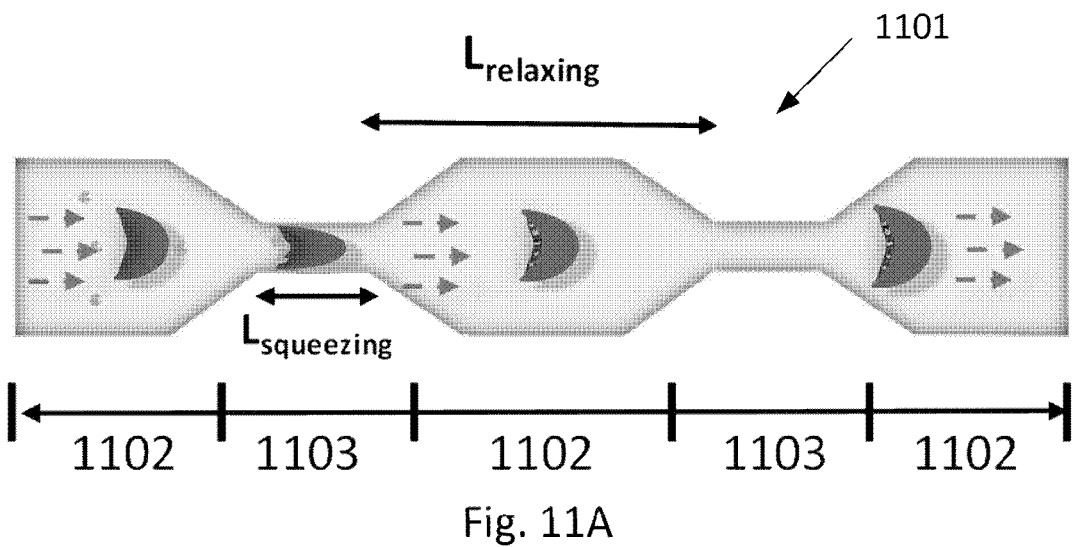
FIGS. 11A and 11B show an embodiment of a squeezing-relaxing module.
Figure 11B:
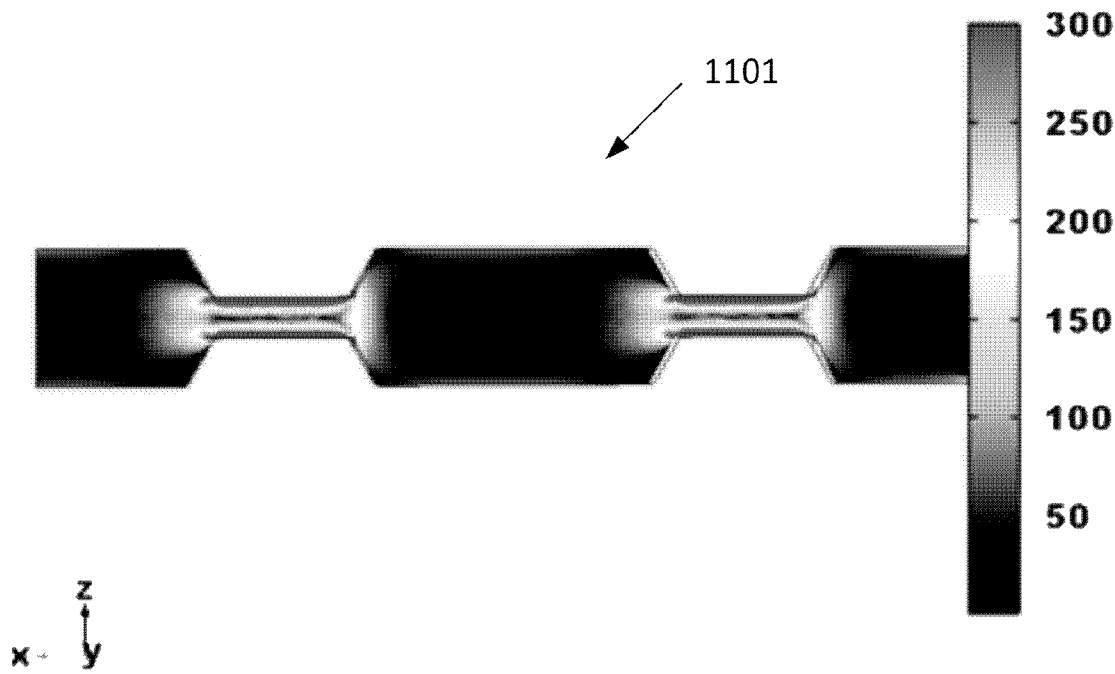

In embodiments, the microfluidic chip 100 includes one or more squeezing-relaxing modules 1101 between the output channels of the cross junction 105 and the output port 104 along the post-mix channels 106A and 106B. FIGS. 11A-B shows an embodiment of a squeezing-relaxing microchannel 1101. As shown, the squeezing-Relaxing microchannels have wide portions 1102 separated by narrow portions 1103. FIGS. 12A-B shows another embodiment of a squeezing-relaxing microchannel 1201 including stress distributions.

Used of a squeezing-relaxing module and/or a constricting serpentine module may be selected based on the softness/stiffness of the cell membrane. Soft and stiff cells are qualitatively categorized by the mechanical properties of their cellular membranes such as the Young's moduli. For example, as measured by atomic force microscopy (AFM), human embryonic kidney (HEK 293) cells with a Young's modulus of 0.3±0.1 kPa and myoblast cells C2C12 with Young's modulus of 0.5±0.2 kPa[4] may be considered softer cells. On the other hand, neuroblastoma (5.2±0.3 kPa[5]) and human RBCs (7.57±3 kPa[6]) of relatively stronger Young's moduli may be considered stiff cells. The shear required to deform the stiffer cell membrane therefore is higher than those needed for softer cells. In embodiments, the magnitude of shear is collectively modulated by the channel width and depth as well as the flow velocity. Squeezing-Relaxing modules may be used for softer membrane cells and constricting serpentine modules may be used for stiffer membrane cells. In embodiments, the narrowness of the squeezing portion and the wideness of the relaxing portion, i.e. the degrees of squeezing and relaxing, may be selected based on the softness/stiffness of the cell membranes and the recovery speed of the cell membranes. FIG. 13 shows a representing a design of a squeezing-relaxing module for the two different categories of cells.

Results

Figure 14A:
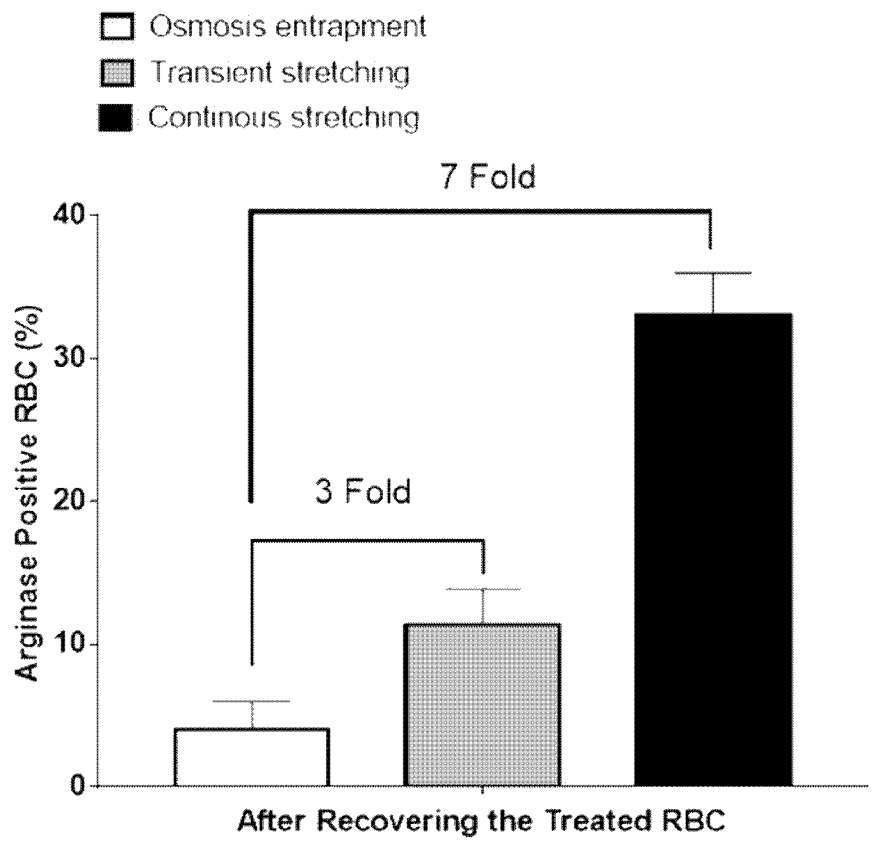
FIGS. 14A and 14B show results of the model payload (Arginase) loading efficiency and enzymatic activity.
Figure 14B:
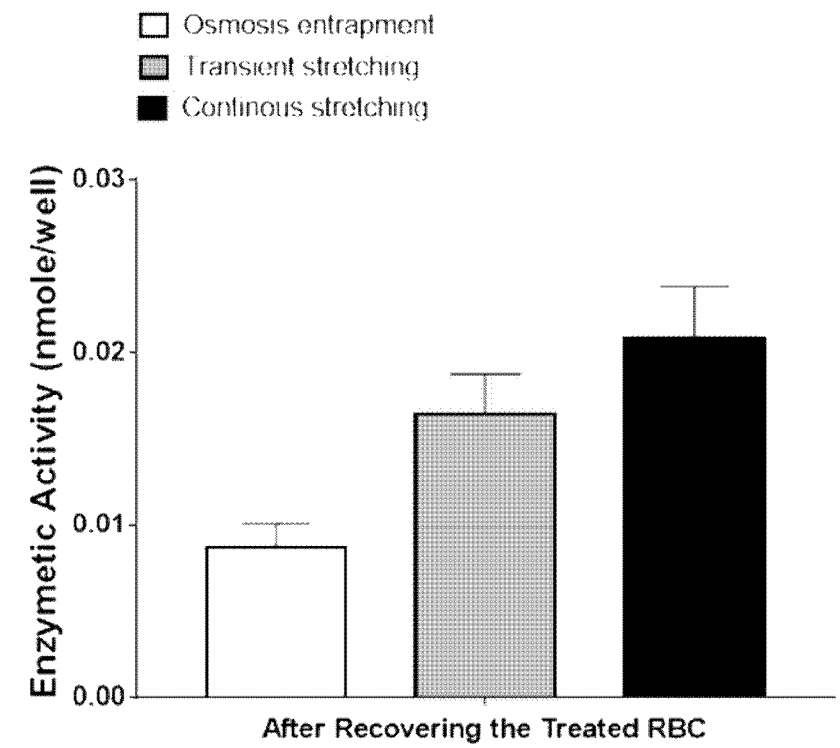

FIGS. 14A and 14B show results of the Model Payload Loading Efficiency: Model payload (Arginase) delivery to red blood cells by controllably deforming cell membrane. (A) Arginase loading efficiency by the proposed concept compare to widely used osmosis entrapment of payloads. (B) Functionality of the delivery payload verified by the enzymatic activity. Results are plotted as mean±SD (n=3 independent treatments).

Experimental results showed that when RBCs experienced an extensional stress of around 80 Pa around the stagnation point of a cross-junction as disclosed above, transient membrane deformation enables around 15% of loading, determined by the fluorescently labeled arginase (Molecular Weight 35 KDa). The loading efficiency is about 3-fold higher than its counterpart osmotic entrapment, as shown in FIG. 14A. In embodiments, The loading efficiency is proportional to the inertia of the delivered payload. A shown in the figures, for both cases, >90% of treated RBCs were recovered, the recovery rate was measured using flow cytometer from forward scattering and side scattering signal intensities, which correlated to the size and granularity of the detected cells, respectively. Further, integrity of the treated RBC was quantified by the measuring percentage of cells with phosphatidylserine (PS) externalization from inner leaflet to the outer leaflet of cell membrane (FIG. 15A), unexposed percentage of PS indicates the membrane integrity and from cytosolic enzyme lactate dehydrogenase (LDH) release after treatment, as shown in FIG. 15B. For both assays, results show that the said microfluidic approach causes less damage to the cell membrane yet yielding higher loading efficiency (FIG. 14A) compare to the osmosis entrapment. The effect of the duration of stress on loading efficiency was determined by further passing the cells through the serpentine channel, as disclosed above, to induce extended (up to 3 millisecond exposure duration) deformation of RBC membrane, which showed 7-folds increase of enzyme loading efficiency compared to the osmotic entrapment (FIG. 14A). The functionality of the delivered payloads was verified by the enzymatic activity, which is in agreement with the loading efficiency (FIG. 14B), for cells of softer membrane.

Figure 15A:
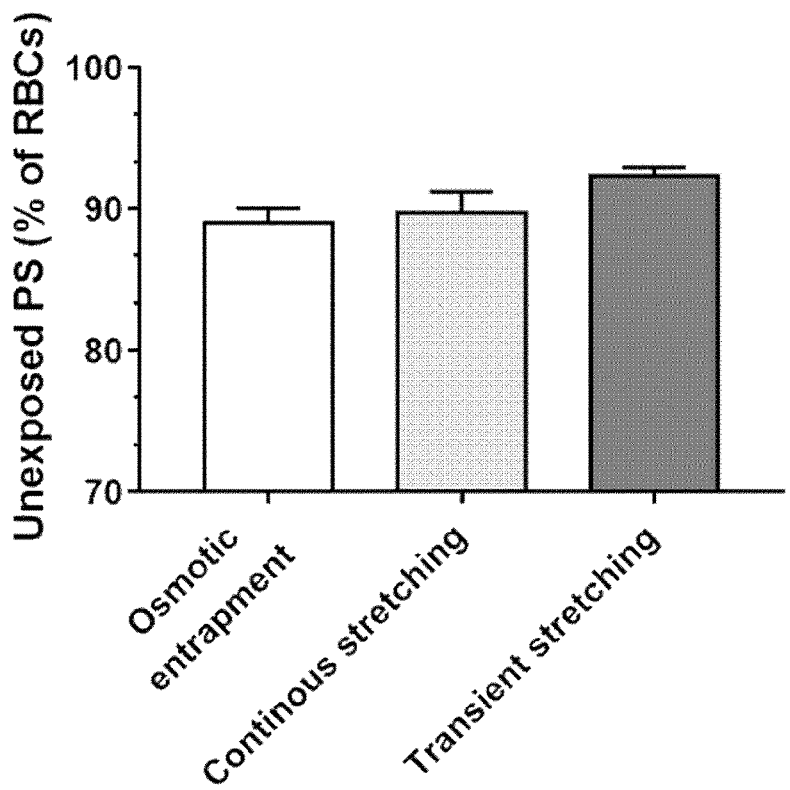
FIGS. 15A and 15B show results of the integrity of the treated cells (as an indications of unexposed percentage of PS) treated with different approaches.
Figure 15B:
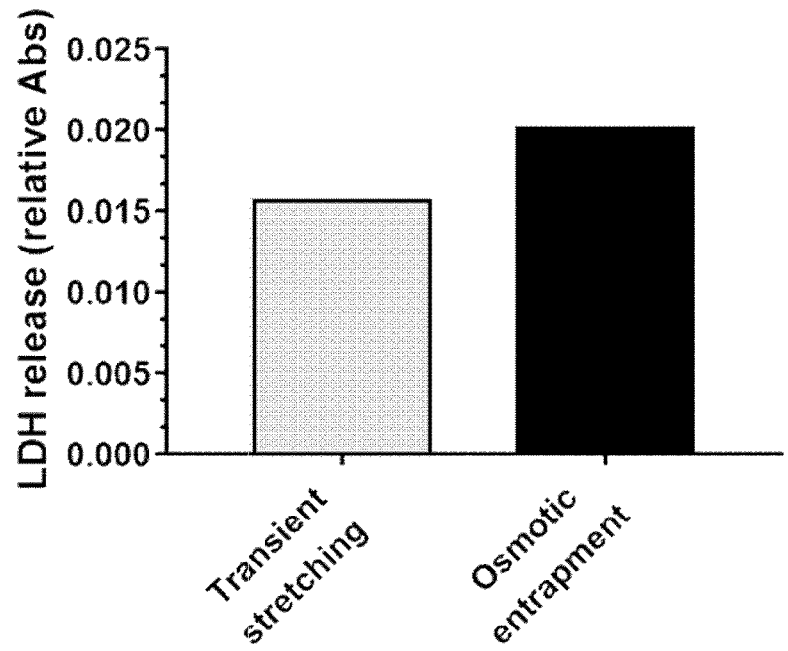

FIGS. 15A and 15B show the integrity of the treated cells: Integrity of the treated RBC. (A) Percentage of treated cells with Phosphatidylserine (PS) compared with cross junction microchannel with osmosis entrapment. Higher Annexin V positive percentage is an indication of damage on the cell membrane. (B) Cytosolic enzyme lactate dehydrogenase (LDH) release due to the possible membrane damage caused by the treatment approaches.

Figure 15C:
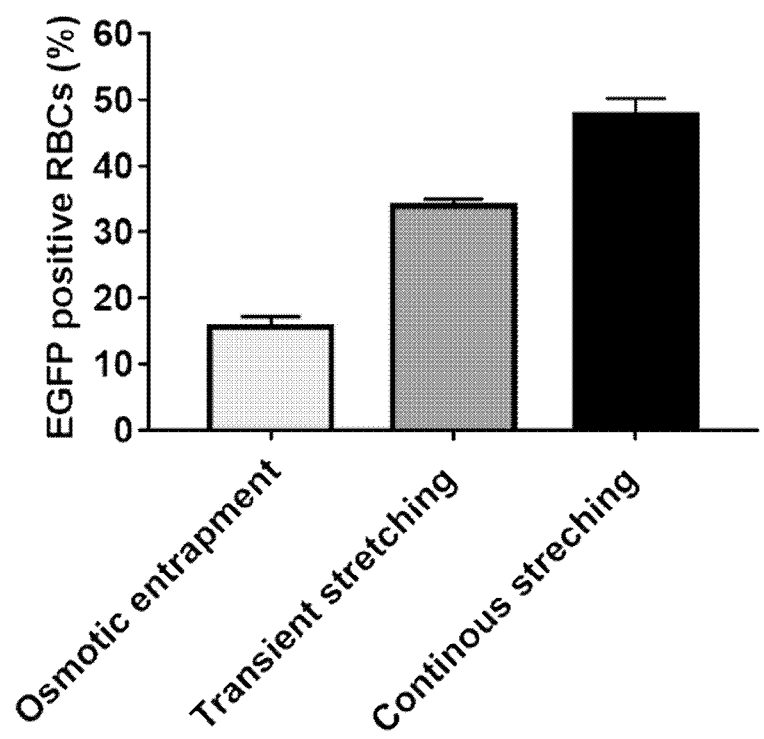
FIG. 15C shows the model payload (EGFP) loading to RBCs.

The loading efficiency is about 2.5-fold higher than its counterpart of osmotic entrapment, as shown in FIG. 15C. The effect of extended deformation was evidenced in FIG. 15C as well by showing a 5-fold increase of EGFP loading efficiency compared to the osmotic entrapment.

Figure 16:
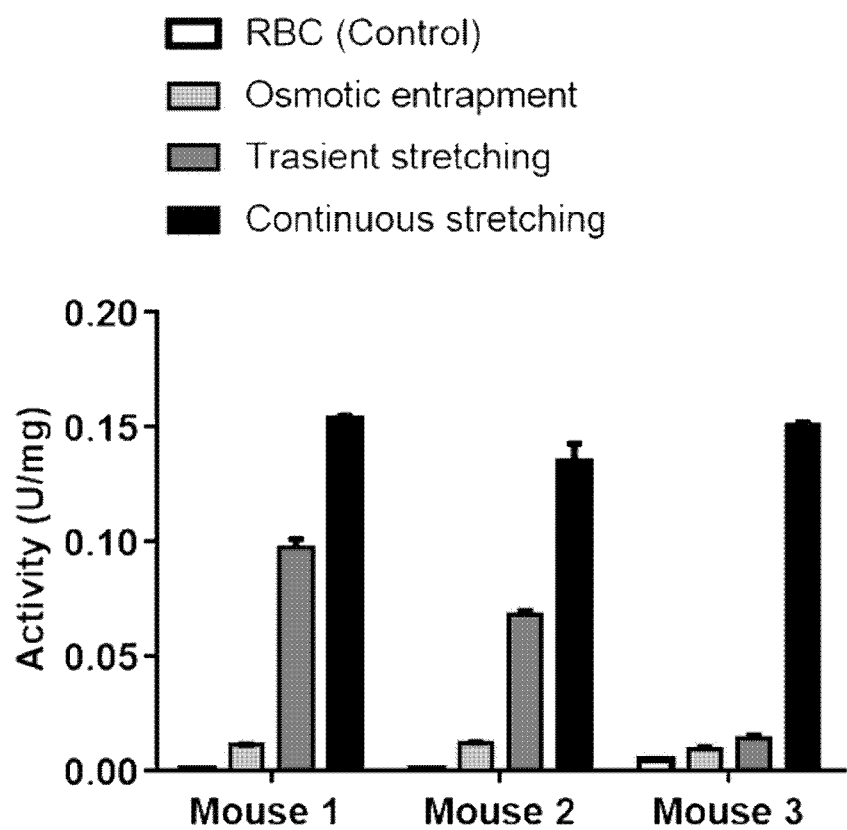
FIG. 16 shows results of enzymatic activity measured from the Arginase-loaded RBCs treated with different approaches.

The microfluidics systems as disclosed herein may be used for delivering functional enzymes. For example, Arginase (MW 35.1 KDa) may be delivered at the optimum conditions of transient and extended deformation, as disclosed above. The functionality of the delivered arginase was verified by the enzymatic activity as shown in FIG. 16. The activity of encapsulated arginase is about 7-fold and 13-fold higher compared to osmotic entrapment with the transient and extended deformation strategies, respectively.

The various aspects, embodiments, implementations or features of the described embodiments can be used separately or in any combination. In particular, it should be appreciated that the various elements of concepts from FIGS. 1-17 may be combined without departing from the spirit or scope of the invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The invention claimed is:

1. A microfluidic device for delivering a payload into a cell, the device comprising:
    a microfluidic chip of a generally planar shape and having a plurality of channels and defined therein and which includes:
        a first input port configured to receive cells suspended in a first fluid solution;

a first channel of the plurality, the first channel extending along a first axis;

a second input port configured to receive a payload suspended in a second fluid solution;

a second channel of the plurality of channels, the second channel extending along a second axis transverse to the first axis;

a third channel of the plurality of channels, the third channel extending along the first axis;

a fourth channel of the plurality, the fourth channel extending along the second axis;

a cross-junction, at which the first channel, the second channel, the third channel and the fourth channel intersect at a central intersection along a center of the cross-junction, wherein the first input port is fluidly coupled to the first channel and the first channel extends between the first input port and the intersection such that a flow of the first fluid solution from the first input port flows through the first channel into the central intersection;

wherein the second input port is fluidly coupled to the third channel and the third channel extends between the second input port and the intersection such that a flow of the second fluid solution from the second input port flows through the third channel into the central intersection;

wherein the first and third channels extend from opposite directions toward the intersection such that, when the first and second fluid solutions are introduced into the first and second input ports, the flows of the first and second fluid solutions combine in the cross-junction and form a stagnation point in the central intersection which causes shear to be applied onto cellular membranes of the cells in the first fluid solution so that the cellular membranes stretch and form pores that receive and associate with the payload from the second fluid solution, thereby loading cells with the payload; and an output port that is fluidly coupled to both the second and fourth channels, wherein the second and fourth channels extend from the intersection in opposite directions along the second axis such that, when the first and second fluid solutions are introduced into the first and second input ports and combine at the central intersection, the loaded cells in the combined first and second solution flow from the central intersection and out the output port.

2. The microfluidic device of claim 1, wherein a width of an opening of each of the first and third channels at the central intersection are the same, and wherein a width of each of the openings of the second and fourth channels at the central intersection are same, so that the stagnation point is at a center of the central intersection.

3. The microfluidic device of claim 1, wherein a width of an opening of each of the first and third channels at the central intersection are greater than a width of each of the openings of the second and fourth channels at the central intersection.

4. The microfluidic device of claim 1, wherein a width of an opening of each of the first and third channels at the central intersection are between 15 and 30 micrometers, and wherein a width of an opening of each of the second and fourth channels at the central intersection are between 20 and 50 micrometers.

5. The microfluidic device of claim 1, wherein the first and third channels taper toward the central intersection so that flows of the first and second fluid solutions are focused toward a center of the central intersection.

6. The microfluidic device of claim 1, wherein the first channel tapers toward the central intersection and wherein the third channel is wider than the first channel at the central intersection.

7. The microfluidic device of claim 1, further comprising a constriction zone in one or both of the second and fourth channels between the central intersection and the output port, wherein the constriction zone comprises a narrowing of the respective channel that, when the fluid flows through the plurality of channels, stretches the loaded cells to cause the payload associated with the cell membranes to be encapsulated within the cells.

8. The microfluidic device of claim 7, wherein the constriction zone is a serpentine pathway comprising a plurality of S-shaped bends that, when the fluid flows through the plurality of channels, induce rotation of the loaded cells, thereby increasing interaction between the payload and cells.

9. The microfluidic device of claim 8, wherein an internal width of the serpentine pathway is less than an internal width of a post-mix channel between the cross-junction and the serpentine pathway.

10. The microfluidic device of claim 7, wherein the constriction zone has a squeezing-relaxing portion in which the respective channel includes a series of squeezing sections alternating with a series of relaxing sections, wherein the squeezing sections have an internal width that is narrower than an internal width of the relaxing sections that cause the payload to be further encapsulated within the loaded cells when the fluid flows through the plurality of channels.

11. The microfluidic device of claim 7, further comprising a relaxing zone disposed in the second and/or fourth channel between the intersection and the constriction zone, wherein the respective channel in the relaxing zone has an enlarged width that, when fluid flows through the plurality of channels, reduces stress in the cell membranes of the loaded cells.

12. The microfluidic device of claim 1, wherein the device facilitates loading of both nucleated and enucleated cells.

13. A method for delivering a payload into a cell, the method comprising: providing the microfluidic device of claim 1;

introducing a plurality of cells into the first channel, via the first port, the first channel extending to the cross-junction module of the microfluidic device introducing a payload into the third channel via the second port; and causing a flow of fluid from the third channel, through the central intersection, and into the second and fourth channels forming the stagnation point in the central intersection, wherein the flow causes shear to be applied onto cellular membranes of the plurality of cells at the stagnation point so that the cellular membrane stretches and forms pores that receive and associate the payload with the cellular membrane, and wherein after receiving the payload the cell flows from the central intersection through one of the second or fourth channels.

14. The method of claim 13, wherein widths of openings of the first and third channels at the central intersection are the same so that a flow of fluid from the first channel and the flow of fluid from the third channel are equal so that the stagnation point is at a center of the central intersection.

15. The method of claim 13, wherein the first and third channels taper toward the central intersection so that a flow of fluid from the first channel including the cell is focused toward a center of the central intersection.

16. The method of claim 13, wherein after receiving the payload and flowing through the second channel or the fourth channel the cell flow through a constriction zone of the microfluidic device that causes the payload associated with the cell membranes to be encapsulated within the cell.

17. The method of claim 16, wherein the constriction zone includes a serpentine pathway comprising a plurality of S-shaped bends that cause the cell to rotate, thereby increasing interaction between the payload and cells.

18. The method of claim 17, wherein an internal width of the serpentine pathway is less than an internal width of a post-mix channel that the cell flows through between the cross-junction module and the serpentine pathway.

19. The method of claim 16, wherein the constriction zone includes a squeezing-relaxing portion comprising an internal channel with a series of alternating squeezing sections and relaxing sections, and wherein the cell flows through the squeezing sections having an internal width that is narrower than an internal width of the relaxing sections that the cell also flows through.

20. The method of claim 16, wherein after flowing through the cross-junction module and prior to flowing through the constriction zone the cell flows through a relaxing zone that reduces stress on the cell membrane.

21. The method of claim 20, wherein the relaxing zone includes a serpentine pathway comprising a plurality of S-shaped bends.

22. The method of claim 13, wherein the device facilitates loading of both nucleated and enucleated cells.

* * * * *